(12) United States Patent
Kagaya et al.

(10) Patent No.: US 10,528,792 B2
(45) Date of Patent: Jan. 7, 2020

(54) DISPLAY APPARATUS AND DISPLAY CONTROL METHOD FOR SIMULTANEOUSLY DISPLAYING A PLURALITY OF IMAGES

(71) Applicant: CANON KABUSHIKI KAISHA, Tokyo (JP)

(72) Inventors: Sosuke Kagaya, Tokyo (JP); Hirofumi Urabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/616,827

(22) Filed: Jun. 7, 2017

(65) Prior Publication Data
US 2017/0364729 A1 Dec. 21, 2017

(30) Foreign Application Priority Data

Jun. 17, 2016 (JP) ................................. 2016-120610
Mar. 10, 2017 (JP) ................................. 2017-045878

(51) Int. Cl.
| | | |
|---|---|---|
| *G09G 5/30* | (2006.01) | |
| *G06T 7/174* | (2017.01) | |
| *G06K 9/00* | (2006.01) | |
| *G09G 5/00* | (2006.01) | |
| *G09G 5/14* | (2006.01) | |

(52) U.S. Cl.
CPC ............ *G06K 9/0014* (2013.01); *G06T 7/174* (2017.01); *G09G 5/003* (2013.01); *G09G 5/30* (2013.01); *G06T 2200/24* (2013.01); *G06T 2207/10056* (2013.01); *G09G 5/14* (2013.01);

(Continued)

(58) Field of Classification Search
CPC .................................. G09G 5/00; G09G 5/30
See application file for complete search history.

(56) References Cited

U.S. PATENT DOCUMENTS 8,340,453 B1* 12/2012 Chen ....................... G06T 5/002
382/254
2003/0159153 A1* 8/2003 Falvo ..................... H04N 7/163
725/110

(Continued)

FOREIGN PATENT DOCUMENTS

CN 1690843 A 11/2005
CN 102811306 A 12/2012

(Continued)

*Primary Examiner* — Weiming He
(74) *Attorney, Agent, or Firm* — Canon U.S.A., Inc. I.P. Division

(57) ABSTRACT

A display apparatus performs predetermined image processing on at least one image data item among the plurality of image data items, does not perform the predetermined image processing on at least another one image data item among the plurality of image data items, and to cause a display unit to display the plurality of image data items, if (A) it is determined, on the basis of meta-information associated with the plurality of image data items, that the plurality of image data items are image data items that have been output from a single image output apparatus, or if (B) it is determined that a display mode is set in which a plurality of image data items are to be displayed, the plurality of image data items including a first image data item and a second image data item generated by duplicating the first image data item.

17 Claims, 14 Drawing Sheets

(52) U.S. Cl.
CPC ..... *G09G 2340/12* (2013.01); *G09G 2370/04* (2013.01); *G09G 2370/20* (2013.01)

(56) References Cited

U.S. PATENT DOCUMENTS

| | | |
|---|---|---|
| 2008/0297622 A1 | 12/2008 | Miyashita |
| 2009/0027515 A1 | 1/2009 | Maruyama et al. |
| 2010/0079356 A1* | 4/2010 | Hoellwarth .......... G02B 27/017 345/8 |
| 2010/0194917 A1 | 8/2010 | Funamoto |
| 2011/0069150 A1* | 3/2011 | Cole ..................... H04N 19/00 348/42 |
| 2014/0043504 A1 | 2/2014 | Ito et al. |
| 2015/0042835 A1 | 2/2015 | Chiu |

FOREIGN PATENT DOCUMENTS

| | | |
|---|---|---|
| CN | 105323456 A | 2/2016 |
| JP | 2002-142148 A | 5/2002 |
| JP | 2009-124644 A | 6/2009 |
| JP | 2013-009278 A | 1/2013 |
| JP | 2013-137635 A | 7/2013 |
| WO | 2015/037794 A1 | 3/2015 |

* cited by examiner

FIG. 3

| IMAGE-QUALITY SETTING INFORMATION | |
|---|---|
| IMAGE-QUALITY SETTING TARGET | ALL IMAGES |
| PEAKING | ON |
| FALSE COLOR | OFF |
| MONOCHROME | OFF |
| BLUE ONLY | OFF |

FIG. 4

| SIGNAL FORMAT INFORMATION | |
|---|---|
| HORIZONTAL RESOLUTION | 1920 |
| VERTICAL RESOLUTION | 1080 |
| FRAME RATE | 60 |
| I/P | PROGRESSIVE |
| FORMAT | 4:2:2 YCbCr |
| COLOR DEPTH | 10 BIT |

FIG. 5

| IMAGE CAPTURING APPARATUS INFORMATION | |
|---|---|
| MODEL NAME | C500 |
| SERIAL NO. | c21192884 |
| IMAGE CAPTURING DATE AND TIME | 2016/4/13 |
| F-NUMBER | F8 |
| SHUTTER SPEED | 1/15 |
| ISO SPEED | 800 |
| FOCAL LENGTH | 40 mm |

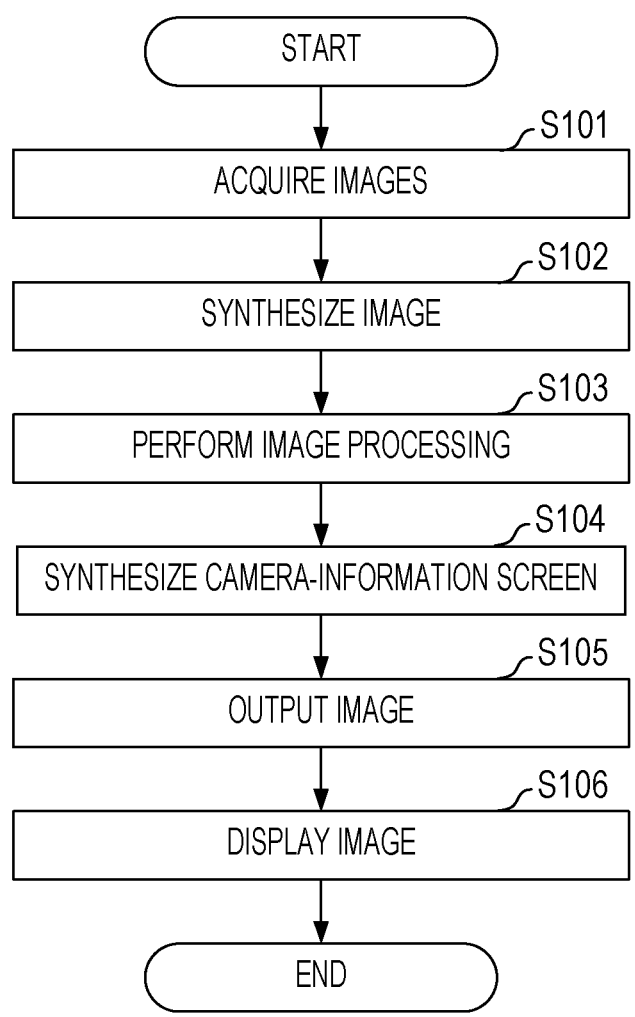

FIG. 10A

| IMAGE-QUALITY SETTING INFORMATION | |
|---|---|
| IMAGE-QUALITY SETTING TARGET | ALL IMAGES |
| PEAKING | OFF |
| FALSE COLOR | ON |
| MONOCHROME | OFF |
| BLUE ONLY | OFF |

FIG. 10B

| IMAGE-QUALITY SETTING INFORMATION | |
|---|---|
| IMAGE-QUALITY SETTING TARGET | LEFT IMAGE |
| PEAKING | OFF |
| FALSE COLOR | ON |
| MONOCHROME | OFF |
| BLUE ONLY | OFF |

FIG. 13

| THROUGH-OUT INFORMATION | |
|---|---|
| MODEL NAME | DP9999 |
| SERIAL NO. | d847h738912 |
| INPUT UNIT | 1 |

DISPLAY APPARATUS AND DISPLAY CONTROL METHOD FOR SIMULTANEOUSLY DISPLAYING A PLURALITY OF IMAGES

BACKGROUND OF THE INVENTION

Field of the Invention

The present invention relates to display apparatuses and display control methods for displaying images.

Description of the Related Art

Display apparatuses that can simultaneously display a plurality of images are known. Japanese Patent Laid-Open No. 2013-137635 discloses a display apparatus that can display a plurality of images side by side for ease of image analysis performed by a user, the plurality of images having been obtained by performing different image processing procedures on the same image.

In recent years, in filmmaking scenes, there have been cases where images captured by using image capturing apparatuses are displayed on a display apparatus so that a cameraman can check the image quality of the captured images in real time. In such filmmaking scenes, a user such as a cameraman wishes to input a plurality of movie signals that have been output from the same image capturing apparatus to the display apparatus and to compare a plurality of image data items included in the plurality of movie signals by performing image processing only on one of the plurality of image data items.

However, in the related art, as disclosed in Japanese Patent Laid-Open No. 2013-137635, if the plurality of image data items are to be displayed, the user has to set what kind of image processing is to be performed on each of the image data items. Such manual setting is tiresome for the user, and there has been a demand for a method for displaying the plurality of image data items without bothering the user as much as possible.

SUMMARY OF THE INVENTION

A first aspect of the present invention provides a display apparatus including a display unit configured to display an image; an image acquiring unit configured to acquire a plurality of image data items from outside; and a display control unit configured to perform predetermined image processing on at least one image data item among the plurality of image data items, to not perform the predetermined image processing on at least another one image data item among the plurality of image data items, and to cause the display unit to display the plurality of image data items, if (A) it is determined, on the basis of meta-information associated with the plurality of image data items, that the plurality of image data items are image data items that have been output from a single image output apparatus, or if (B) it is determined that a display mode is set in which the plurality of image data items are to be displayed, the plurality of image data items including a first image data item and a second image data item generated by duplicating the first image data item.

A second aspect of the present invention provides a display apparatus including a display unit configured to display an image; an image acquiring unit configured to acquire a plurality of image data items from outside; and a display control unit configured to dispose output-apparatus information related to a single image output apparatus at a position corresponding to at least one image data item among the plurality of image data items, to not dispose the output-apparatus information at a position corresponding to at least another one image data item among the plurality of image data items, and to cause the display unit to display the plurality of image data items, if (A) it is determined, on the basis of meta-information associated with the plurality of image data items, that the plurality of image data items are image data items that have been output from the image output apparatus, or if (B) it is determined that a display mode is set in which the plurality of image data items are to be displayed, the plurality of image data items including a first image data item and a second image data item generated by duplicating the first image data item.

Further features of the present invention will become apparent from the following description of exemplary embodiments with reference to the attached drawings.

BRIEF DESCRIPTION OF THE DRAWINGS

FIG. 3 is a table illustrating an example of image-quality setting information.

FIG. 4 illustrates an example of movie-signal format information.

FIG. 5 illustrates an example of output-apparatus information.

FIG. 6 is a flowchart illustrating a process flow of the display apparatus.

FIG. 10A illustrates a setting status of the image-quality setting information in a case where the display mode is set to the "first-image display mode".

FIG. 10B illustrates a setting status of the image-quality setting information in a case where the display mode is switched from the "first-image display mode" to the "multi-image display mode".

FIG. 13 is a table illustrating an example of through-out information.

DESCRIPTION OF THE EMBODIMENTS

First Embodiment

Overview of Display Apparatus 1

Figure 1A:
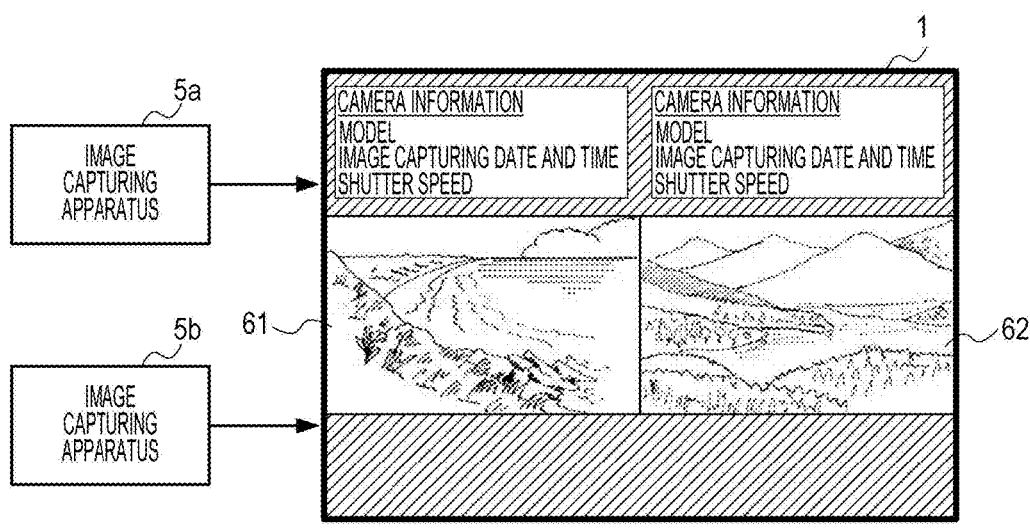
FIG. 1A is a first diagram illustrating an overview of a display apparatus according to a first embodiment.
Figure 1B:
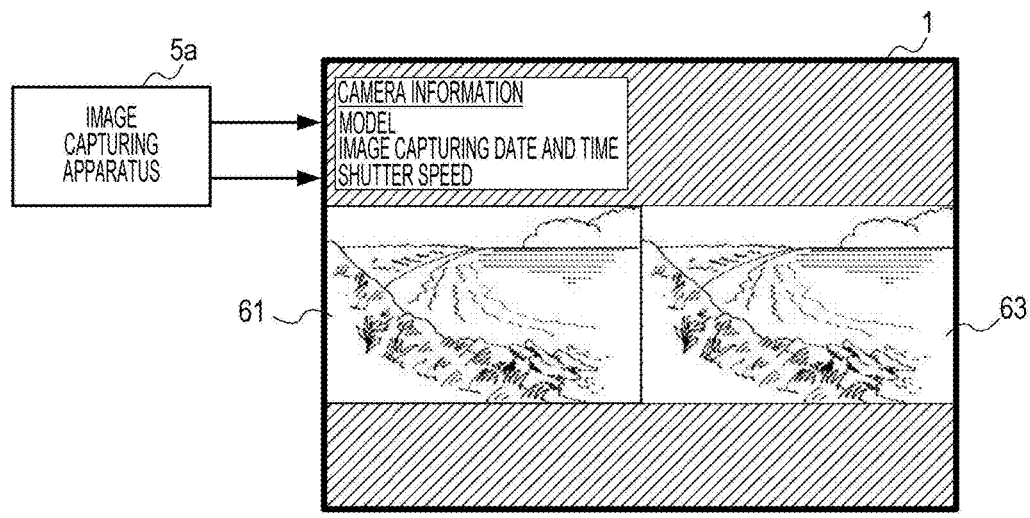
FIG. 1B is a second diagram illustrating the overview of the display apparatus according to the first embodiment.

FIGS. 1A and 1B illustrate an overview of a display apparatus 1 according to a first embodiment. Upon reception of a plurality of movie signals from one or more image capturing apparatuses 5, the display apparatus 1 can simultaneously display a plurality of image data items based on the plurality of movie signals that have been input. FIG. 1A illustrates a state where image data 61 that has been output from an image capturing apparatus 5a and image data 62 that has been output from an image capturing apparatus 5b are input to the display apparatus 1 and where the display apparatus 1 is displaying the image data 61 and the image data 62. FIG. 1B illustrates a state where the image data 61 and image data 63 that have been output from the image capturing apparatus 5a are input to the display apparatus 1 and where the display apparatus 1 is displaying the image data 61 and the image data 63. The image capturing apparatus 5a and the image capturing apparatus 5b are each an image output apparatus that outputs captured images.

The display apparatus 1 can display an image that is obtained by performing predetermined image processing on at least one of the plurality of image data items based on the plurality of movie signals and an image that is obtained by superposing, on at least one of the plurality of image data items, information (hereinafter referred to as output-apparatus information) related to the image capturing apparatus 5 that has output the image data items. The output-apparatus information is information regarding an image capturing apparatus that outputs movie signals to be input to the display apparatus 1 or information regarding an image capturing environment and is, for example, information indicating the model name of the image capturing apparatus, the image capturing date and time, the shutter speed, and the like.

The display apparatus 1 determines whether or not the plurality of image data items are image data items that have been output from the same image capturing apparatus 5, and if the plurality of image data items have not been output from the same image capturing apparatus 5, the display apparatus 1 performs predetermined image processing on the plurality of image data items and displays the plurality of image data items. In contrast, if the plurality of image data items have been input from the same image capturing apparatus 5, the display apparatus 1 performs predetermined image processing on at least one image data item, does not perform predetermined image processing on the other image data items, and displays the plurality of image data items.

In FIG. 1A, it is assumed that the display apparatus 1 displays the image data 61 and the image data 62 that have been output from the image capturing apparatus 5a and the image capturing apparatus 5b. In this case, the image data 61 and the image data 62 are subjected to the same image processing and are displayed with corresponding output-apparatus information related to the image capturing apparatus 5a and the image capturing apparatus 5b. Thus, a user can easily compare the image data 61 and the image data 62 with each other by performing the same image processing on different image data items that have been output from different image capturing apparatuses 5.

In contrast, in FIG. 1B, it is assumed that the display apparatus 1 displays the image data 61 and the image data 63 that have been output from a single apparatus, the image capturing apparatus 5a. For example, if the image capturing apparatus 5 can output RAW image data as the image data 62 and monitor image data as the image data 63, a cameraman may wish to compare the image data 62 and the image data 63 with each other by displaying the monitor image data in monochrome and by displaying the RAW image data in color.

In such a case, as illustrated in FIG. 1B, the display apparatus 1 performs image processing on the image data 61 but does not perform image processing on the image data 63. In addition, the display apparatus 1 superposes the output-apparatus information on the image data 61 but does not superpose the output-apparatus information on the image data 63. For example, as illustrated in FIG. 1B, the display apparatus 1 disposes and displays the output-apparatus information at a position corresponding to the image data 61 but does not dispose nor display the output-apparatus information at a position corresponding to the image data 63. Thus, a user can compare the image data 61 and the image data 63 with each other in a state where, for example, the image data 61 is displayed by extracting only one of colors in the image data 61, and thereby the user can check the influence of the extracted color on the appearance of the image.

On the basis of the output-apparatus information, the display apparatus 1 controls which image data item among the plurality of image data items is to be subjected to image processing. By the display apparatus 1 having such a configuration, the cameraman can compare image data items with each other by performing different image processing procedures on image data items that have been output from the same image capturing apparatus without manually performing setting operation.

Details of the configuration and operations of the display apparatus 1 will be described below.

Configuration of Display Apparatus 1

Figure 2:
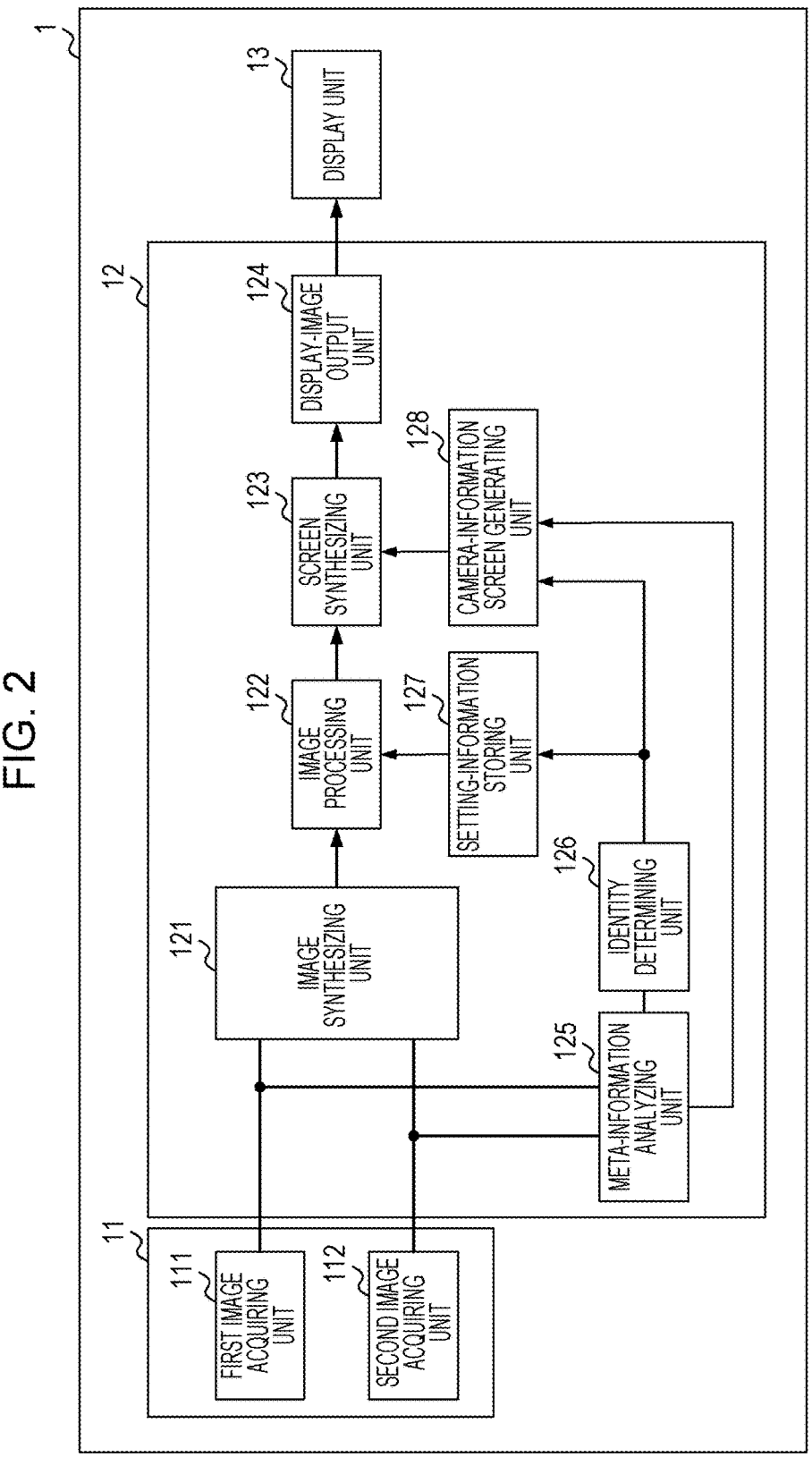
FIG. 2 illustrates the configuration of the display apparatus according to the first embodiment.

FIG. 2 illustrates the configuration of the display apparatus 1 according to the first embodiment. The display apparatus 1 includes an image acquiring unit 11, a display control unit 12, and a display unit 13. The display unit 13 is a display that displays display-image data that is output from the display control unit 12.

The image acquiring unit 11 includes a first image acquiring unit 111 and a second image acquiring unit 112. The first image acquiring unit 111 and the second image acquiring unit 112 each include, for example, a serial digital interface (SDI) input terminal complying with the SDI standard and respectively acquire a first movie signal including a first image data item and a second movie signal including a second image data item from the image capturing apparatus 5 outside the display apparatus 1. The first image acquiring unit 111 and the second image acquiring unit 112 extract, from the first movie signal and the second movie signal that have been acquired, the first image data item and the second image data item having such a format that can be processed within the display apparatus 1 and output the first image data item and the second image data item to the display control unit 12.

The display control unit 12 includes an image synthesizing unit 121, an image processing unit 122, a screen synthesizing unit 123, a display-image output unit 124, a meta-information analyzing unit 125, an identity determining unit 126, a setting-information storing unit 127, and a camera-information screen generating unit 128. On the basis of the first image data item and the second image data item that have been input from the image acquiring unit 11, the display control unit 12 generates display-image data to be displayed by the display unit 13 and causes the display unit 13 to display the display-image data.

Specifically, the display control unit 12 operates as follows. First, on the basis of meta-information associated with the plurality of image data items that have been acquired by the image acquiring unit 11, the display control unit 12 determines whether or not the plurality of image data items are image data items that have been output from the same image capturing apparatus 5. The display control unit 12 determines, for example, whether or not the meta-information associated with the plurality of image data items that have been acquired by the image acquiring unit 11 indicates that the plurality of image data items are image data items that have been output from the same image capturing apparatus 5. If the plurality of image data items have been output from the same image capturing apparatus 5, the display control unit 12 performs predetermined image processing on at least one image data item among the plurality of image data items, does not perform predetermined image processing on at least another one image data item among the plurality of image data items, and causes the display unit 13 to display the plurality of image data items.

In addition, if the display control unit 12 determines, on the basis of the meta-information, that the plurality of image data items are not image data items that have been output from the same image capturing apparatus 5, the display control unit 12 performs predetermined image processing on all or none of the plurality of image data items and causes the display unit 13 to display the plurality of image data items. If, for example, the meta-information indicates that the plurality of image data items are not image data items that have been output from the same image capturing apparatus 5, the display control unit 12 performs predetermined image processing on all or none of the plurality of image data items and causes the display unit 13 to display the plurality of image data items.

The display control unit 12 causes the first image data item to be displayed in a first region of the display unit 13 and the second image data item to be displayed in a second region of the display unit 13. Accordingly, if the meta-information indicates that the plurality of image data items are image data items that have been output from the same image capturing apparatus 5, the display control unit 12 performs predetermined image processing on the first image data item to be displayed in one region (e.g., the first region) among a plurality of regions of the display unit 13 and does not perform predetermined image processing on the second image data item to be displayed in at least another one region (e.g., the second region) among the plurality of regions. If the meta-information indicates that the plurality of image data items are not image data items that have been output from the same image capturing apparatus 5, the display control unit 12 performs predetermined image processing on image data items to be displayed in all regions of the display unit 13 or performs predetermined image processing on none of the image data items and causes the display unit 13 to display the image data items.

In addition, if the meta-information associated with the plurality of image data items indicates that the plurality of image data items are image data items that have been output from the same image capturing apparatus 5, the display control unit 12 may superpose the output-apparatus information on at least one image data item (e.g., the first image data item) among the plurality of image data items, may not superpose the output-apparatus information on at least another one image data item (e.g., the second image data item) among the plurality of image data items, and may cause the display unit 13 to display the plurality of image data items. For example, the display control unit 12 causes the output-apparatus information to be disposed and displayed at a position corresponding to the first image data item but does not cause the output-apparatus information to be disposed nor displayed at a position corresponding to the second image data item. If the meta-information indicates that the plurality of image data items are not image data items that have been output from the same image capturing apparatus 5, the display control unit 12 causes the output-apparatus information to be disposed and displayed at positions corresponding to all of the image data items among the plurality of image data items. Thus, it is possible to prevent the same information from being displayed at a plurality of portions of the display unit 13, thereby increasing image visibility.

Furthermore, the display control unit 12 may further use movie-signal format information as the meta-information. Specifically, on the basis of the movie-signal format of the plurality of image data items, the display control unit 12 determines whether or not the plurality of image data items are identical. If the plurality of image data items are identical, the display control unit 12 performs predetermined image processing on at least one image data item among the plurality of image data items, does not perform predetermined image processing on at least another one image data item among the plurality of image data items, and causes the display unit 13 to display the plurality of image data items.

In addition, if the movie-signal format information indicates that the plurality of image data items are identical, the display control unit 12 superposes the output-apparatus information on at least one image data item among the plurality of image data items, does not superpose the output-apparatus information on at least another one image data item among the plurality of image data items, and causes the display unit 13 to display the plurality of image data items. For example, the display control unit 12 causes the output-apparatus information to be disposed and displayed at a position corresponding to at least one image data item among the plurality of image data items and does not cause the output-apparatus information to be disposed nor displayed at a position corresponding to at least another one image data item among the plurality of image data items. If the movie-signal format information indicates that the plurality of image data items are not identical, the display control unit 12 causes the output-apparatus information to be displayed by being superposed on all of the image data items among the plurality of image data items. For example, the display control unit 12 causes the output-apparatus information to be disposed and displayed at positions corresponding to all of the image data items.

Now, details of operations performed by each unit of the display control unit 12 will be described below.

The image synthesizing unit 121 synthesizes the first image data item and the second image data item that have been input from the first image acquiring unit 111 and the second image acquiring unit 112 on the basis of a display mode that has been set by a user. Here, the display mode is related to a mode for displaying the first image data item and the second image data item. The display apparatus 1 has three display modes: a "first-image display mode" in which only the first image data item is displayed; a "second-image display mode" in which only the second image data item is displayed; and a "multi-image display mode" in which the first image data item and the second image data item are simultaneously displayed, and the user can select a desired display mode.

If the display mode is the "first-image display mode", the image synthesizing unit 121 outputs only the first image data item to the image processing unit 122. If the display mode is the "second-image display mode", the image synthesizing unit 121 outputs only the second image data item to the image processing unit 122. If the display mode is the "multi-image display mode", the image synthesizing unit 121 outputs synthesized image data to the image processing unit 122, the synthesized image data having been obtained by synthesizing the first image data item and the second image data item to be disposed in left and right regions of the display unit 13.

The image processing unit 122 performs image processing on image data that has been input from the image synthesizing unit 121, the image processing being indicated by image-quality setting information that has been acquired from the setting-information storing unit 127, and outputs the image data that has been subjected to the image processing to the screen synthesizing unit 123. Here, the image-quality setting information is information indicating details of image processing and is stored in the setting-information storing unit 127 in the form of a table, for example.

FIG. 3 is a table illustrating an example of the image-quality setting information.

An "image-quality setting target" is information regarding a setting to be referred to if the display mode is the "multi-image display mode" and is information indicating which image data or region of "all images", "left image", and "right image" is to be subjected to image processing. FIG. 3 illustrates a state where "all images" in which both the first image data item and the second image data item are to be displayed is set.

"Peaking" is a function for enhanced-displaying (coloring-displaying) a region corresponding to a contour section of an image. If the "peaking" is "on", this function is performed; if the "peaking" is "off", this function is not performed.

A "false color" is a function for adding different colors according to the brightness level of a movie. If the "false color" is "on", this function is performed; if the "false color" is "off", this function is not performed.

"Monochrome" is a function for displaying an image in monochrome. If the "monochrome" is "on", this function is performed; if the "monochrome" is "off", this function is not performed.

"Blue only" is a function for removing red components and green components from an image and displaying only blue components on a monochrome image. If the "blue only" is "on", this function is performed; if the "blue only" is "off", this function is not performed.

The screen synthesizing unit 123 generates synthesized-image data by superposing, on image data that has been input from the image processing unit 122, camera-information screen data including camera information as the output-apparatus information that has been input from the camera-information screen generating unit 128, and outputs the generated synthesized-image data to the display-image output unit 124. The screen synthesizing unit 123 generates synthesized-image data including, for example, image data that has been input from the image processing unit 122 and camera-information screen data that is disposed near the image data.

The display-image output unit 124 outputs the synthesized image data that has been input from the screen synthesizing unit 123 to the display unit 13.

The meta-information analyzing unit 125 extracts the meta-information such as the movie-signal format information and the output-apparatus information, the movie-signal format information being included in the first image data item and the second image data item that have been input from the first image acquiring unit 111 and the second image acquiring unit 112. The meta-information analyzing unit 125 outputs the extracted meta-information to the identity determining unit 126. In addition, the meta-information analyzing unit 125 also outputs the output-apparatus information to the camera-information screen generating unit 128.

The movie-signal format information is information regarding the formats of movie signals that are output from image capturing apparatuses. FIG. 4 illustrates an example of the movie-signal format information. As illustrated in FIG. 4, the movie-signal format information includes information regarding the resolutions, frame rate, interlace/progressive (I/P) conversion type, color format, and color depth. The movie-signal format information is stored in, for example, an SDI signal pay load data region.

FIG. 5 illustrates an example of the output-apparatus information. As illustrated in the table of FIG. 5, the output-apparatus information includes information such as the model name, serial number, image capturing date and time, f-number, shutter speed, ISO speed, and focal length. The output-apparatus information is stored in, for example, an SDI signal ancillary data region.

On the basis of the output-apparatus information that is associated with the plurality of image data items and that has been input from the meta-information analyzing unit 125, the identity determining unit 126 determines whether or not the plurality of image data items are image data items that have been output from the same image capturing apparatus 5. Specifically, the identity determining unit 126 compares the output-apparatus information associated with the first image data item with the output-apparatus information associated with the second image data item, and if the comparison results correspond to each other, the identity determining unit 126 determines that the plurality of image data items are image data items that have been output from the same image capturing apparatus 5. For example, on the basis of whether or not the model names and image capturing conditions of the image capturing apparatus 5 associated with the plurality of image data items are identical, the identity determining unit 126 determines whether or not the plurality of image data items are image data items that have been output from the same image capturing apparatus 5. The identity determining unit 126 outputs the determination result to the setting-information storing unit 127 and the camera-information screen generating unit 128.

The setting-information storing unit 127 stores setting information that is used for identifying image data or a display region that is the target to be subjected to predetermined image processing. The setting-information storing unit 127 stores, as the setting information indicating the image data that is the target to be subjected to image processing, any information of "all images", "right image", and "left image". The setting-information storing unit 127 may also store, as the setting information indicating the image data that is the target to be subjected to image processing, any information of "all regions", "right region", and "left region".

If the identity determining unit 126 determines that the plurality of image data items are image data items that have been output from the same image capturing apparatus 5, and if the setting information indicates that the target to be subjected to predetermined image processing is all of the image data items or all regions of the display unit 13, the setting-information storing unit 127 changes the target to be subjected to image processing to one image data item (e.g., "right image") among the plurality of image data items or one region (e.g., "right region") of the display unit 13.

The setting-information storing unit 127 may further store setting information that is used for identifying the region in which information regarding an apparatus that has output the image data is to be superposed and displayed or for identifying the image data. In this case, if the identity determining unit 126 determines that the plurality of image data items are image data items that have been output from the same image capturing apparatus 5, and if the setting information indicates that the target to be subjected to predetermined image processing is all of the image data items or all regions of the display unit 13, the setting-information storing unit 127 changes the image data on which the output-apparatus information is to be superposed and displayed to one image data item or one display region.

In response to a request from the image processing unit 122, the setting-information storing unit 127 outputs the setting information to the image processing unit 122. In addition, in accordance with the determination result as to whether or not the plurality of image data items are image data items that have been output from the same image capturing apparatus 5, the result having been input from the identity determining unit 126, the setting-information storing unit 127 updates the setting information to be output to the image processing unit 122. Details of operations when the setting-information storing unit 127 updates the setting information will be described later.

Referring to the meta-information of the first image data item and the second image data item, the meta-information having been input from the meta-information analyzing unit 125, the camera-information screen generating unit 128 generates a camera-information screen and outputs image data (graphic image data) of the camera-information screen to the screen synthesizing unit 123. The camera-information screen generating unit 128 generates a camera-information screen including, for example, the output-apparatus information illustrated in FIG. 5. In accordance with the determination result that has been input from the identity determining unit 126, the camera-information screen generating unit 128 determines whether or not the camera-information screen is to be displayed. If the determination result that has been input from the identity determining unit 126 indicates that the first image data item and the second image data item have been output from the same image capturing apparatus 5, the camera-information screen generating unit 128 generates the camera-information screen in which the output-apparatus information is superposed on one of the image data items and in which the output-apparatus information is not superposed on the other image data items. Details of operations of the camera-information screen generating unit 128 will be described later. Process Flow of Display Apparatus 1

FIG. 6 is a flowchart illustrating a process flow of the display apparatus 1.

First, the first image acquiring unit 111 and the second image acquiring unit 112 acquire image data and meta-information included in movie signals that have been output from the image capturing apparatus 5 (S101).

Then, the image synthesizing unit 121 synthesizes the first image data item and the second image data item in accordance with the display mode (S102). If the display mode is the "first-image display mode", the image synthesizing unit 121 generates a synthesized image data in which the first image data item is disposed at the center of the screen. If the display mode is the "second-image display mode", the image synthesizing unit 121 generates a synthesized image data in which the second image data item is disposed at the center of the screen. If the display mode is the "multi-image display mode", the image synthesizing unit 121 generates a synthesized image data in which the first image data item is disposed at the left of the screen and in which the second image data item is disposed at the right of the screen.

Then, on the basis of the image-quality setting information acquired from the setting-information storing unit 127, the image processing unit 122 performs image processing on the synthesized image data generated by the image synthesizing unit 121 (S103). If the display mode is the "multi-image display mode", on the basis of the "image-quality setting target" according to the image-quality setting information, the image processing unit 122 determines the region to be subjected to image processing. If "image-quality setting target" is "all images", the image processing unit 122 performs predetermined image processing on the plurality of image data items. If "image-quality setting target" is the "left image", the image processing unit 122 performs image processing only on the first image data item to be displayed in the left region of the screen. If "image-quality setting target" is the "right image", the image processing unit 122 performs image processing only on the second image data item to be displayed in the right region of the screen.

Then, the screen synthesizing unit 123 generates display-image data in which, the camera-information screen according to the camera-information screen information that has been input from the camera-information screen generating unit 128 is superposed on the synthesized image data that has been subjected to image processing (S104). The display-image output unit 124 outputs the display-image data generated by the screen synthesizing unit 123 to the display unit 13 (S105). The display unit 13 displays the display-image data that has been input from the display-image output unit 124 (S106).

Display Screen Examples

Figure 7A:
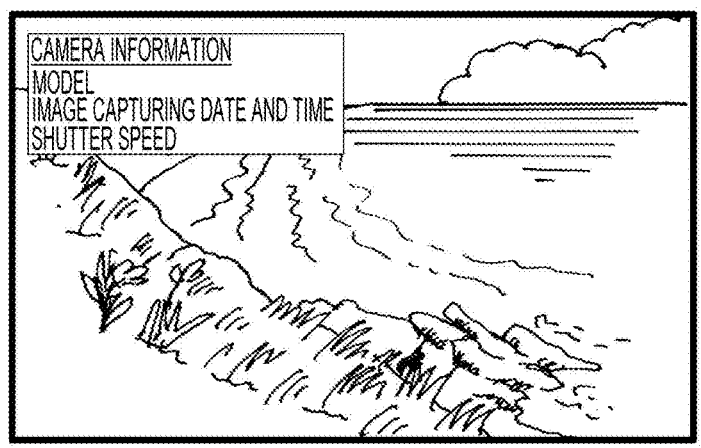
FIG. 7A illustrates an example of a screen displayed if a display mode is a "first-image display mode".
Figure 7B:
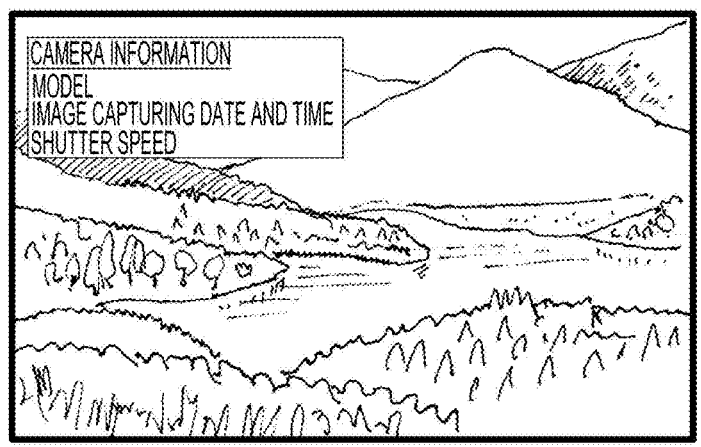
FIG. 7B illustrates an example of a screen displayed if the display mode is a "second-image display mode".
Figure 7C:
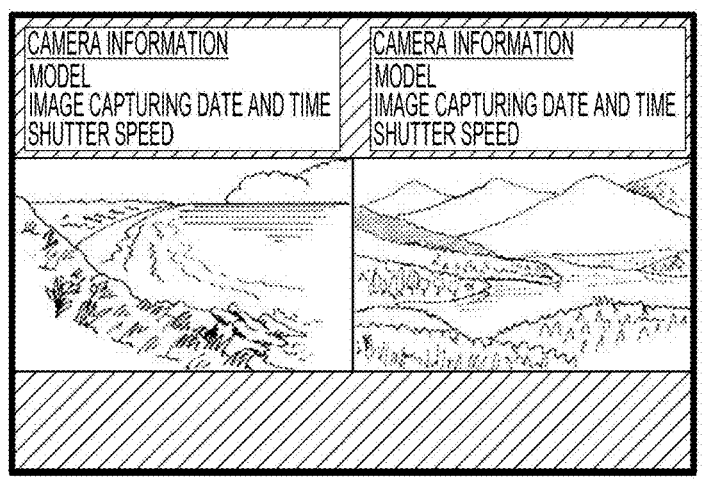
FIG. 7C illustrates an example of a screen displayed if the display mode is a "multi-image display mode".

FIGS. 7A to 7C illustrate examples of screens displayed in the respective display modes. In FIGS. 7A to 7C, examples in which the first image data item and the second image data item have been input from different image capturing apparatuses 5 are illustrated.

FIG. 7A illustrates an example of a screen displayed if the display mode is the "first-image display mode". In this case, the region to be subjected to image processing performed by the image processing unit 122 is the entire screen, and only information corresponding to the first image data item is displayed on the camera-information screen.

FIG. 7B illustrates an example of a screen displayed if the display mode is the "second-image display mode". In this case, the region to be subjected to image processing performed by the image processing unit 122 is the entire screen, and only information corresponding to the second image data item is displayed on the camera-information screen.

FIG. 7C illustrates an example of a screen displayed if the display mode is the "multi-image display mode". In this case, the region to be subjected to image processing performed by the image processing unit 122 is determined in accordance with the "image-quality setting target" according to the image-quality setting information, and information of each of the first image data item and the second image data item is displayed on the camera-information screen.

Process Flow for Displaying Identical Images

Figure 8:
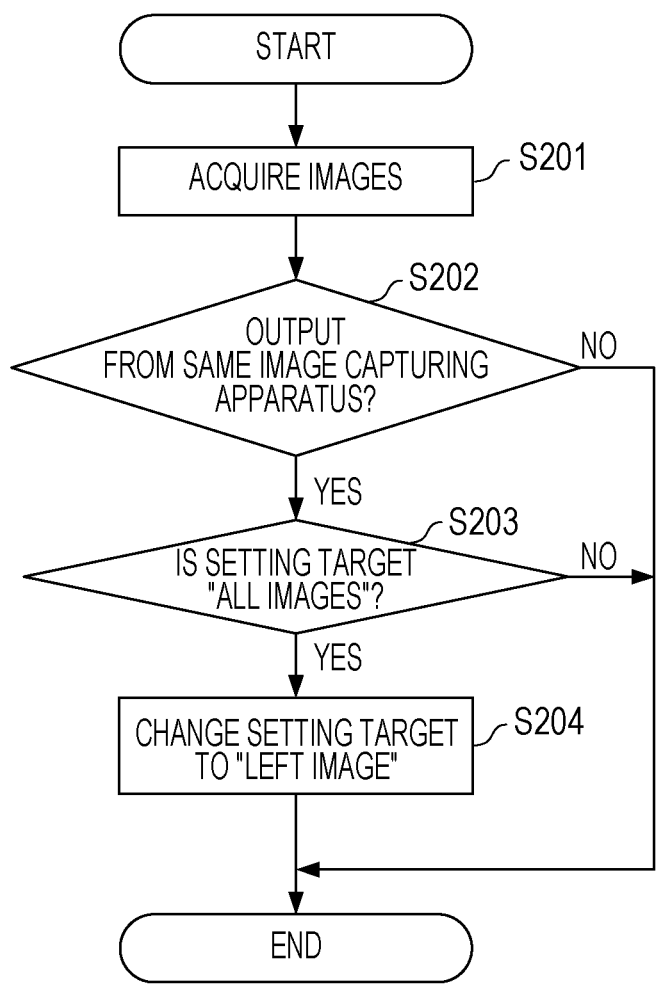
FIG. 8 is a flowchart illustrating a process flow for displaying identical images.

FIG. 8 is a flowchart illustrating a process flow for displaying identical images. The process flowchart in FIG. 8 starts from a step in which the image acquiring unit 11 acquires the first image data item and the second image data item (S201). Upon the image acquiring unit 11 acquiring the first image data item and the second image data item, the identity determining unit 126 determines whether or not the first image data item and the second image data item have been output from the same image capturing apparatus 5 (S202).

By referring to the result of determination performed by the identity determining unit 126, if the determination result indicates that the first image data item and the second image data item have been output from the same image capturing apparatus 5, the setting-information storing unit 127 determines whether or not the "image-quality setting target" according to the image-quality setting information is "all images" (S203). If the "image-quality setting target" is "all images", the setting-information storing unit 127 changes the "image-quality setting target" to the "left image" (S204). If the "image-quality setting target" is not "all images" and the "left image" or the "right image" is set, the setting-information storing unit 127 ends the process without changing the "image-quality setting target".

In this manner, if the plurality of image data items have been output from the same image capturing apparatus 5, and if "all images" is set as the "image-quality setting target", by automatically changing the "image-quality setting target", the display apparatus 1 can perform image processing only on one of the first image data item and the second image data item without a user manually switching the setting. Note that although the display apparatus 1 according to this embodiment superposes the output-apparatus information on image data that is set as the "image-quality setting target", the display apparatus 1 may store other setting information that designates image data as the target on which the output-apparatus information is superposed.

Process Flow of Camera-Information Screen Generating Unit 128

Figure 9:
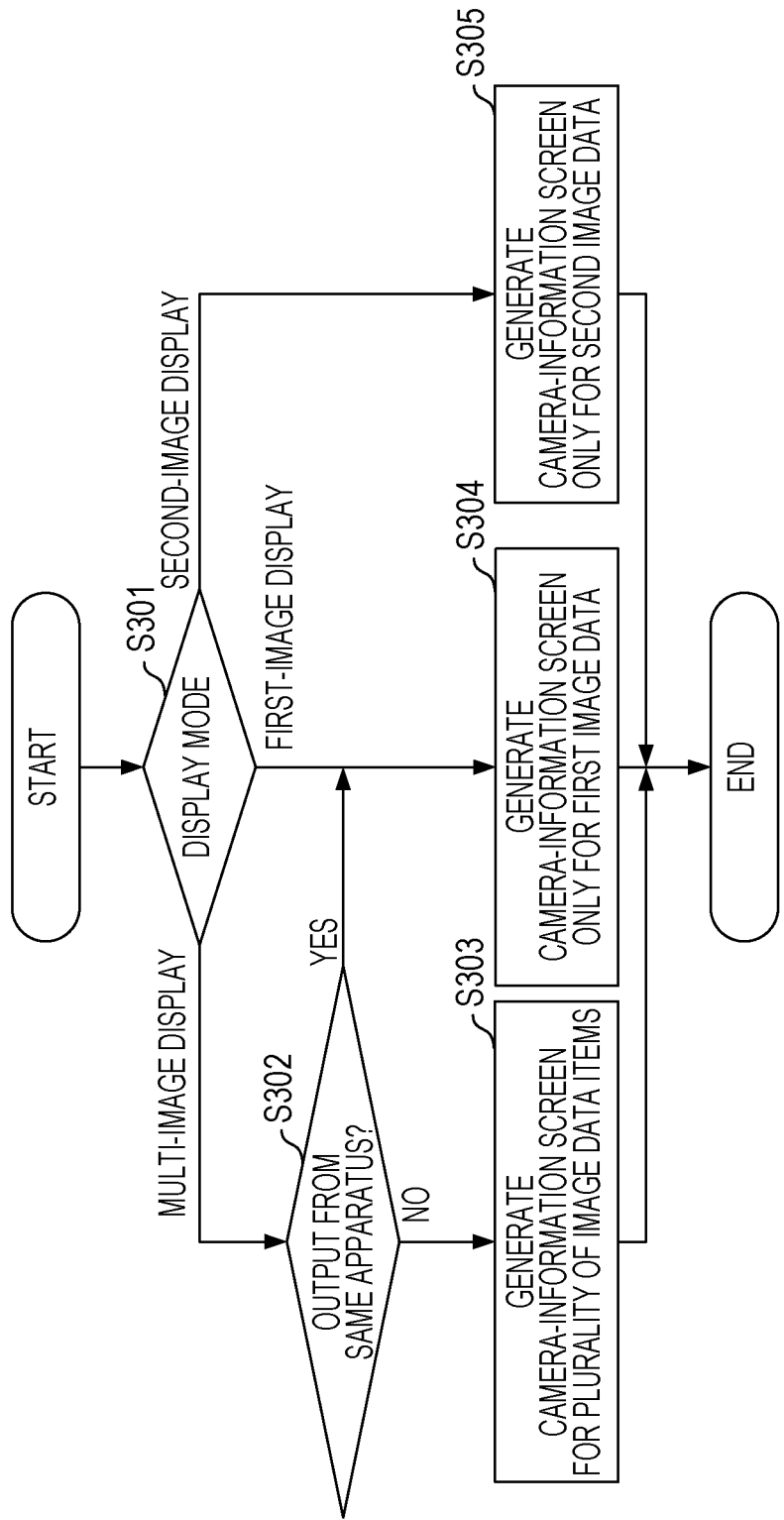
FIG. 9 is a flowchart illustrating a process flow of a camera-information screen generating unit.

FIG. 9 is a flowchart illustrating a process flow of the camera-information screen generating unit 128. The process in the flowchart illustrated in FIG. 9 is started if the display mode is changed, if the result of determination performed by the identity determining unit 126 is changed, or if the meta-information is changed.

Referring to the current display mode, if the display mode is the "multi-image display mode", the camera-information screen generating unit 128 transitions to step S302 and determines whether or not the first image data item and the second image data item have been output from the same image capturing apparatus 5. If the display mode is the "first-image display mode", the camera-information screen generating unit 128 transitions to step S304; if the display mode is the "second-image display mode", the camera-information screen generating unit 128 transitions to step S305 (S301).

If the display mode is the "multi-image display mode", the camera-information screen generating unit 128 refers to the result of determination performed by the identity determining unit 126. If the determination result indicates that the first image data item and the second image data item have not been output from the same image capturing apparatus 5 (NO in S302), the camera-information screen generating unit 128 extracts, from the meta-information of the first image data item and the second image data item, camera information corresponding to each image data item. The camera-information screen generating unit 128 generates a camera-information screen in which first camera information corresponding to the first image data item is disposed in the left region of the display unit 13 and in which second camera information corresponding to the second image data item is disposed in the right region of the display unit 13 (S303).

If the determination result that is referred to in step S302 indicates that the first image data item and the second image data item have been output from the same image capturing apparatus 5 (YES in S302), in order to prevent a plurality of the same camera-information screens from being displayed, the camera-information screen generating unit 128 generates the camera-information screen only for the first image data item (S304). Specifically, the camera-information screen generating unit 128 extracts, from the meta-information of the first image data item, camera information corresponding to the first image data item and generates a camera-information screen including the extracted camera information.

If it is determined in step S301 that the second-image display mode is set, the camera-information screen generating unit 128 extracts, from the meta-information of the second image data item, camera information corresponding to the second image data item. The camera-information screen generating unit 128 generates a camera-information screen including the extracted camera information (S305).

Example of Displaying Identical Images

Figure 11A:
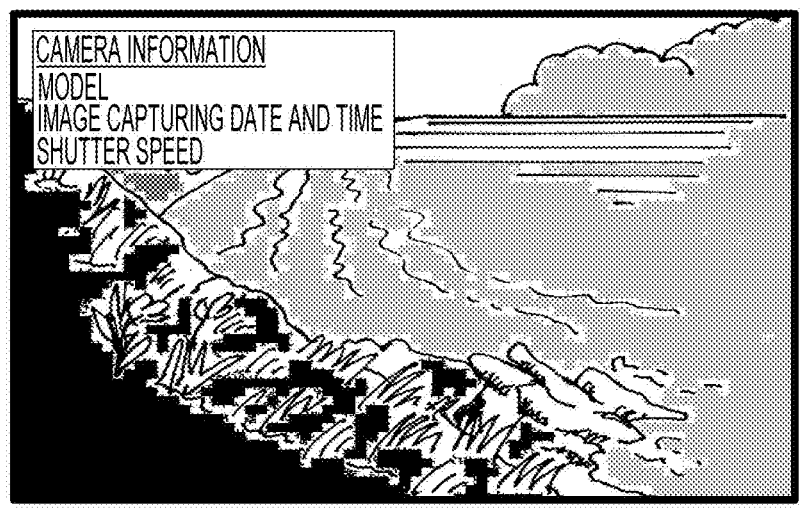
FIG. 11A illustrates an example of a screen displayed if the image-quality setting information is in the status illustrated in FIG. 10A.
Figure 11B:
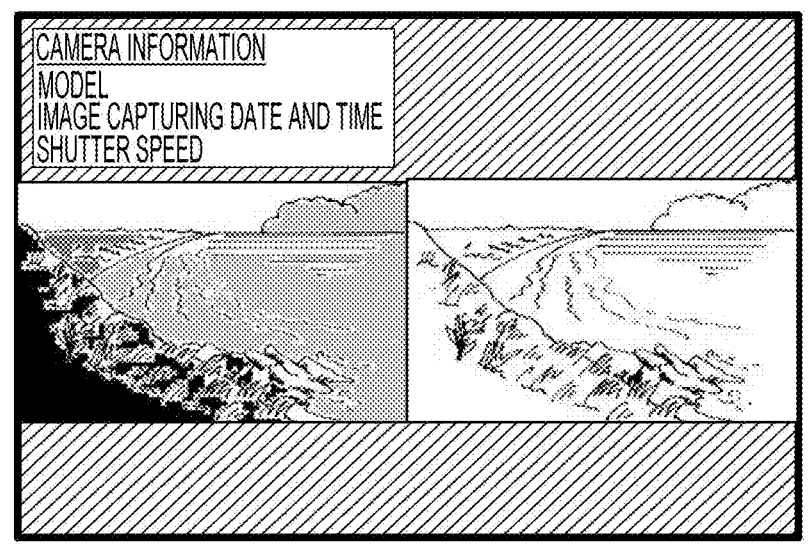
FIG. 11B illustrates an example of a screen displayed if the image-quality setting information is in the status illustrated in FIG. 10B.

Next, results of image processing and examples of screens that are performed and displayed if the first image data item and the second image data item are identical to each other will be described with reference to FIGS. 10A, 10B, 11A, and 11B. FIGS. 10A and 10B illustrate setting statuses of the image-quality setting information. FIGS. 11A and 11B illustrate examples of displayed screens.

FIG. 10A illustrates an example of the image-quality setting information in a case where the display mode is set to the "first-image display mode", and FIG. 11A illustrates an example of a screen displayed in this case. According to the image-quality setting information illustrated in FIG. 10A, the setting is provided such that the image-quality setting target is "all images", the false color is "on", and the other items are "off". FIG. 11A illustrates an example of a screen displayed if the image-quality setting information is in the status illustrated in FIG. 10A. Since the display mode is the "first-image display mode", in FIG. 11A, image processing for false color rendering is performed on all regions, and camera information corresponding to the first image data item that is the display target is displayed.

FIG. 10B illustrates an example of the image-quality setting information in a case where the display mode is switched from the "first-image display mode" to the "multi-image display mode", and FIG. 11B illustrates an example of a screen displayed in this case. If the result of determination performed by the identity determining unit 126 indicates that the first image data item and the second image data item have been output from the same image capturing apparatus 5, in step S203 in the flowchart illustrated in FIG. 8, the image-quality setting target according to the image-quality setting information is changed from the "all images" to the "left image", and accordingly, the image-quality setting information is changed as illustrated in FIG. 10B. Then, image processing according to the "on" setting of the false color is performed only on the first image data item to be displayed in the left region, and the second image data item without performing image processing is displayed in the right region.

In addition, if the display mode is the "multi-image display mode", and if the result of determination performed by the identity determining unit 126 indicates that the first image data item and the second image data item have been output from the same image capturing apparatus 5, as illustrated in step S304 in the flowchart of FIG. 9, only the camera information corresponding to the first image data item is displayed. As a result, as illustrated in FIG. 11B, if the display mode is the "multi-image display mode", and if the first image data item and the second image data item have been output from the same image capturing apparatus 5, image processing is performed only on the left region, and the camera information is displayed only in the left region.

Effects of Display Apparatus 1 According to First Embodiment

As described above, the display apparatus 1 according to the first embodiment determines whether or not image data items corresponding to a plurality of movie signals that have been input have been output from the same image capturing apparatus 5, and if the image data items have been output from the same image capturing apparatus 5, only one of the image data items is subjected to image processing, and the image data items are displayed. In addition, the display apparatus 1 displays only camera information corresponding to the one of the image data items. Thus, if the plurality of image data items have been output from the same image capturing apparatus 5, the display apparatus 1 can display image data that has been subjected to image processing and image data that has not been subjected to image processing. Accordingly, a user can compare the plurality of images with each other without performing setting operation as to which image data item is to be subjected to image processing. This can eliminate the need for the user to manually set the image-quality setting target and can prevent the same camera information items from being simultaneously displayed, which is inconvenient, thereby enabling the user to perform processing more efficiently.

Modifications

Although the table in FIG. 3 has been illustrated as the image-quality setting information in the above description, the image-quality setting information may include more detailed image-quality setting items.

In addition, although the table in FIG. 4 has been illustrated as the signal format information used by the identity determining unit 126 to determine whether or not the plurality of image data items are identical image data items in the above description, the signal format information may include more detailed format information.

Although the table in FIG. 5 has been illustrated as the output-apparatus information used by the identity determining unit 126 to determine whether or not the plurality of image data items have been output from the same image capturing apparatus 5 in the above description, the output-apparatus information may include more detailed information.

In addition, although the identity determining unit 126 determines whether or not the plurality of image data items are identical image data items on the basis of the result of comparison between all items of the meta-information in the above description, the identity determining unit 126 may use only part of the meta-information.

Furthermore, although the case where the display apparatus 1 acquires two image data items and simultaneously displays the two image data items has been described above, the display apparatus 1 may display more image data items. For example, the display apparatus 1 may display four image data items in four regions: upper left region, upper right region, lower left region, and lower right region. In this case, if at least two image data items among the four image data items have been output from the same image capturing apparatus 5, the display apparatus 1 performs predetermined image processing on one of the two image data items and does not perform predetermined image processing on the other. In addition, the output-apparatus information is superposed on one of the two image data items, and the output-apparatus information is not superposed on the other.

Second Embodiment

A display apparatus 2 according to a second embodiment is different from the display apparatus 1 according to the first embodiment in that the display apparatus 2 has a through-out function of outputting movie signals that have been input without any processing.

Figure 12:
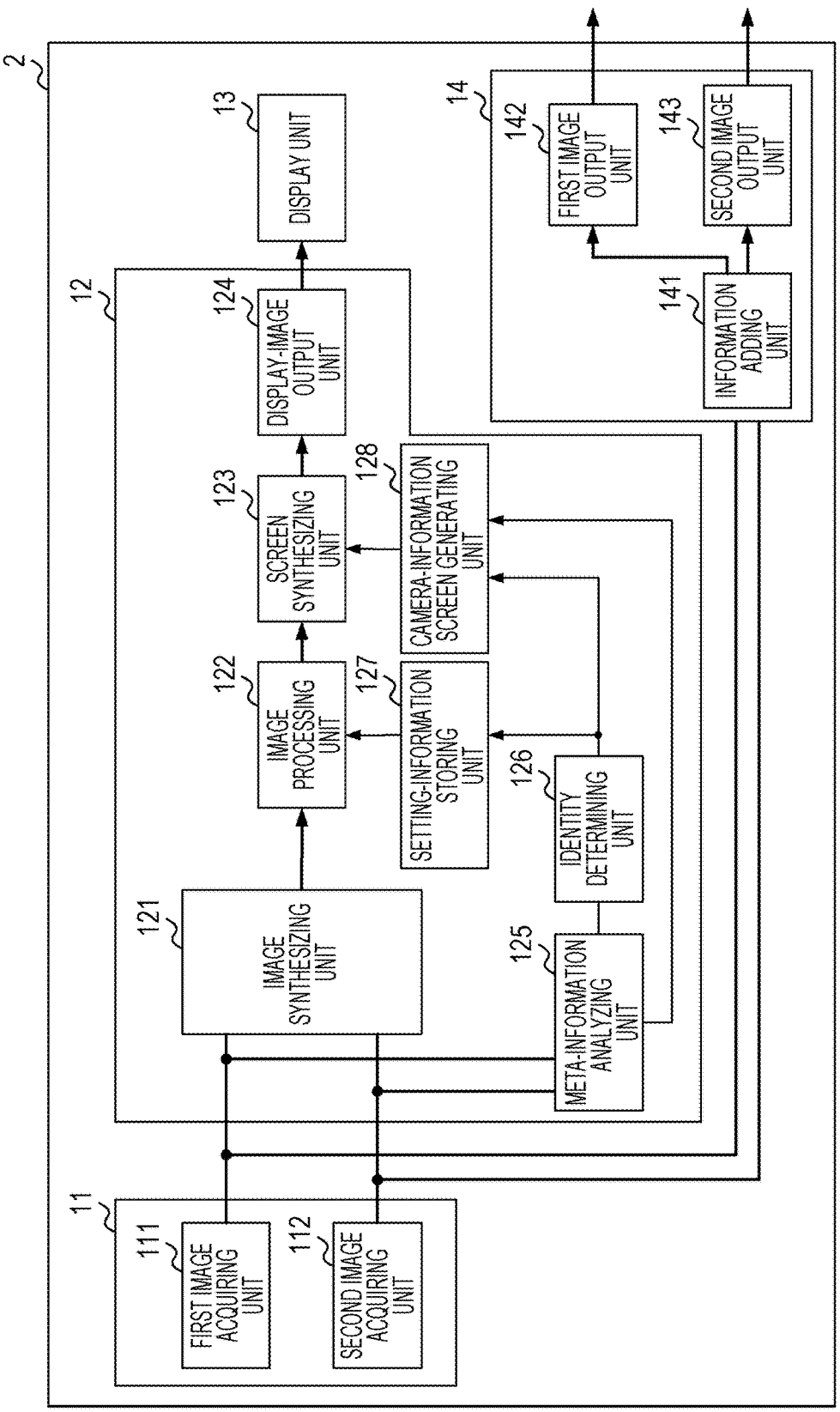
FIG. 12 illustrates the configuration of a display apparatus according to a second embodiment.

FIG. 12 illustrates the configuration of the display apparatus 2 according to the second embodiment. Now, different points from the display apparatus 1 according to the first embodiment will be described below.

The display apparatus 2 includes the image acquiring unit 11, the display control unit 12, and the display unit 13 as in the display apparatus 1, and also includes an image output unit 14. The image output unit 14 includes an information adding unit 141, a first image output unit 142, and a second image output unit 143. The image output unit 14 adds display-apparatus information associated with the display apparatus 2 to at least one image data item among the plurality of image data items acquired by the image acquiring unit 11 and outputs the image data item. Details of the display-apparatus information will be described later.

The first image acquiring unit 111 outputs the first image data item that has been acquired to the image synthesizing unit 121 and the meta-information analyzing unit 125, and also to the information adding unit 141. Similarly, the second image acquiring unit 112 outputs the second image data item that has been acquired to the image synthesizing unit 121 and the meta-information analyzing unit 125, and also to the information adding unit 141.

The information adding unit 141 adds through-out information as the display-apparatus information to the first image data item and the second image data item that have been input and outputs the first image data item and the second image data item to the first image output unit 142 and the second image output unit 143. The information adding unit 141 adds the through-out information to, for example, an unused region in the SDI-signal ancillary data region. The through-out information includes information for identifying the display apparatus 2 and input-unit information for identifying through which of a plurality of image acquiring interfaces (e.g., the first image acquiring unit 111 and the second image acquiring unit 112) included in the image acquiring unit 11 the image data item has been acquired.

FIG. 13 is a table illustrating an example of the through-out information. As illustrated in FIG. 13, the through-out information includes the model name, serial number, and input-unit information. As the model name, the model name of the display apparatus 2 that outputs image data items by performing the through-out function is stored. As the serial number, the serial number of the display apparatus 2 that outputs image data items by performing the through-out function is stored. As the input-unit information, information indicating which of the first image acquiring unit 111 and the second image acquiring unit 112 has acquired the image data to be output is stored. In this embodiment, if the image data item acquired by the first image acquiring unit 111 is to be output, "1" is stored as the input-unit information; if the image data item acquired by the second image acquiring unit 112 is to be output, "2" is stored as the input-unit information.

The first image output unit 142 and the second image output unit 143 output movie signals including the first image data item and the second image data item to which the through-out information has been added by the information adding unit 141. In this embodiment, the movie signal including the first image data item acquired by the first image acquiring unit 111 is output from the first image output unit 142, and the output movie signal is input to a second image acquiring unit 112 of a display apparatus 2 that is an external apparatus.

If the through-out information included in the meta-information associated with the first image data item acquired by the first image acquiring unit 111 includes the input-unit information corresponding to the second image acquiring unit 112, the display control unit 12 determines that the plurality of image data items are image data items that have been output from the same image capturing apparatus 5. The process performed by the display control unit 12 for determining, on the basis of the determination result, an image data item or a region that is the target to be subjected to image processing is the same as the process in the first embodiment. As in the first embodiment, on the basis of the determination result, the display control unit 12 may determine the image data item or region that is the target for or in which the output-apparatus information is to be displayed.

Figure 14:
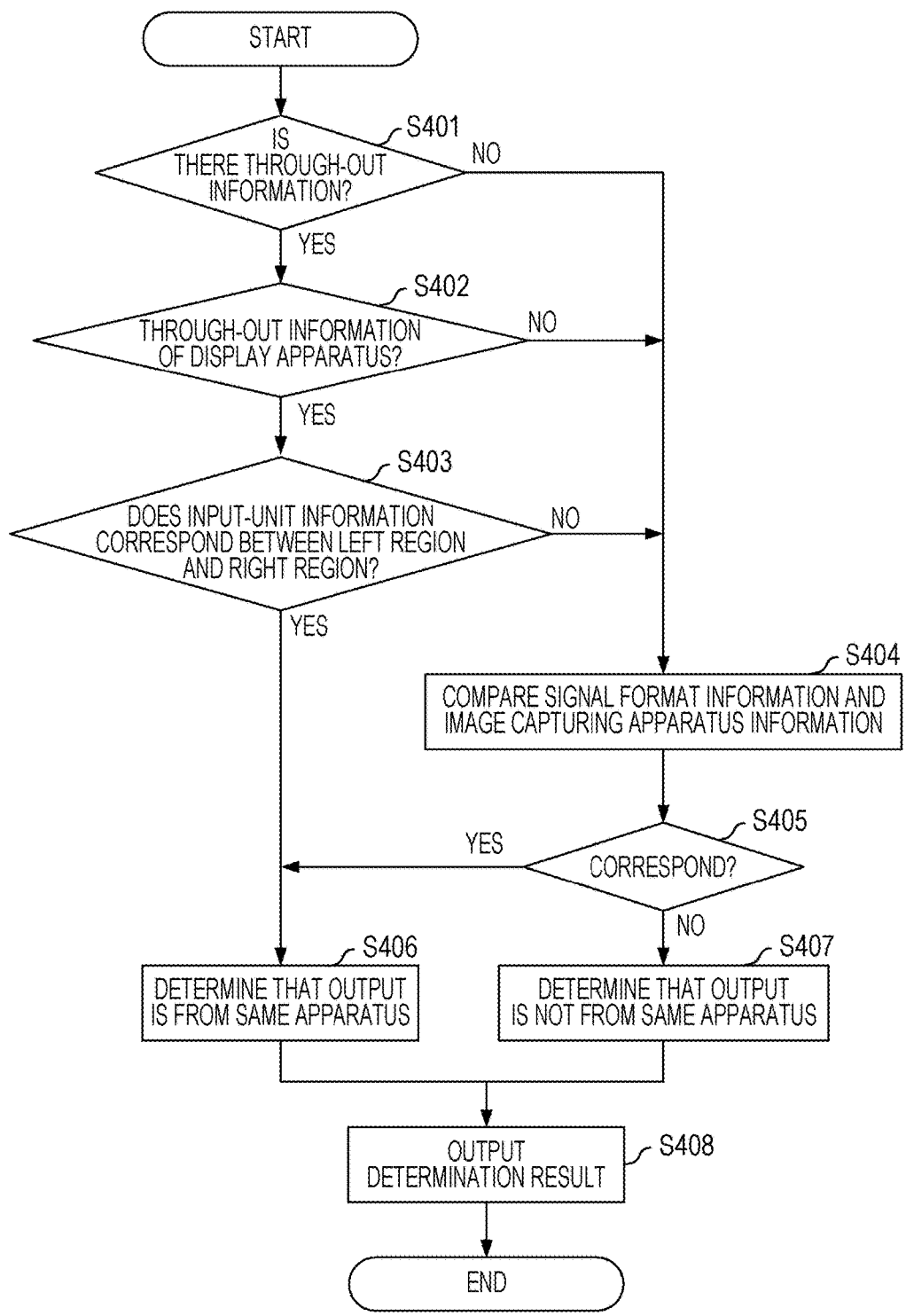
FIG. 14 is a flowchart of a process in which an identity determining unit determines the identity of an image capturing apparatus that has output a plurality of image data items.

FIG. 14 is a flowchart of a process in which the identity determining unit 126 according to the second embodiment determines the identity of the image capturing apparatus 5 that has output the plurality of image data items. The flowchart in FIG. 14 starts upon input of meta-information to the identity determining unit 126.

Upon input of the meta-information, the identity determining unit 126 determines whether or not the meta-information includes the through-out information (S401). If it is determined that the meta-information includes the through-out information, the identity determining unit 126 transitions to step S402; if it is determined that the meta-information does not include the through-out information, the identity determining unit 126 transitions to step S404.

In step S402, the identity determining unit 126 determines whether or not the model name and serial number according to the through-out information are identical to the model name and serial number of the display apparatus 2. If the identity determining unit 126 determines that the model name and serial number according to the through-out information are identical to the model name and serial number of the display apparatus 2, the process transitions to step S403; if the identity determining unit 126 determines that the model name and serial number according to the through-out information are not identical to the model name and serial number of the display apparatus 2, the process transitions to step S404 (S402).

In step S403, the identity determining unit 126 determines whether or not the input-unit information according to the through-out information corresponds to a first image acquiring unit 111 that is different from the second image acquiring unit 112 that has acquired an image data item including the through-out information. That is, the identity determining unit 126 determines whether or not the second image data item that is the target to be displayed in the left region is identical to the first image data item that is the target to be displayed in the right region. For example, if the input-unit information according to the through-out information included in the second image data item acquired by the second image acquiring unit 112 is "1", the identity determining unit 126 determines that the second image data item is identical to the first image data item that has been input to the first image acquiring unit 111.

If the input-unit information according to the through-out information of the image data item acquired by one of the first image acquiring unit 111 and the second image acquiring unit 112 corresponds to the other image acquiring unit, the identity determining unit 126 determines that image data acquired by the other image acquiring unit has been output by performing the through-out function, and the process transitions to step S406. If the input-unit information according to the through-out information of the image data item acquired by one of the first image acquiring unit 111 and the second image acquiring unit 112 does not correspond to the other image acquiring unit, the identity determining unit 126 transitions to step S404.

In step S404, the identity determining unit 126 compares the signal format information and the output-apparatus information corresponding to the first image data item with the signal format information and the output-apparatus information corresponding to the second image data item, as in the display apparatus 1 according to the first embodiment. As a result of comparison, if the signal format information and the output-apparatus information corresponding to the first image data item are identical to the signal format information and the output-apparatus information corresponding to the second image data item, the identity determining unit 126 transitions to step S406; if not, the identity determining unit 126 transitions to step S407 (S405).

In step S406, the identity determining unit 126 determines that the first image data item and the second image data item have been output from the same image capturing apparatus 5. In addition, in step S407, the identity determining unit 126 determines that the first image data item and the second image data item have not been output from the same image capturing apparatus 5. The identity determining unit 126 outputs the results of determination in steps S406 and S407 to the setting-information storing unit 127 and the camera-information screen generating unit 128 (S408).

Effects of Display Apparatus 2 According to Second Embodiment

As described above, the display apparatus 2 outputs, by performing the through-out function, the movie signal corresponding to the first image data item acquired by the first image acquiring unit 111. By using the through-out information added to the movie signal that has been output by performing the through-out function, in a use case of inputting the movie signal that has been output to the second image acquiring unit 112 by performing the through-out function, the display apparatus 2 can easily determine whether or not the plurality of image data items that have been input to the image acquiring unit 11 have been output from the same image capturing apparatus 5 without referring to the signal format information and the output-apparatus information. Since the display apparatus 2 does not have to refer to the signal format information nor the output-apparatus information, even if a movie signal that does not include the signal format information nor the output-apparatus information as the meta-information has been input, the display apparatus 2 can determine whether or not the plurality of image data items have been output from the same image capturing apparatus 5.

Third Embodiment

A display apparatus 3 according to a third embodiment is different from the display apparatus 1 according to the first embodiment and the display apparatus 2 according to the second embodiment in that the display apparatus 3 has a function of duplicating a movie signal that has been input. The display apparatus 3 duplicates a movie signal to generate a left image and a right image, and accordingly, the display apparatus 3 determines whether or not the left image is identical to the right image by determining whether or not the image-quality mode for a left screen is identical to the image-quality mode for a right screen.

Figure 15:
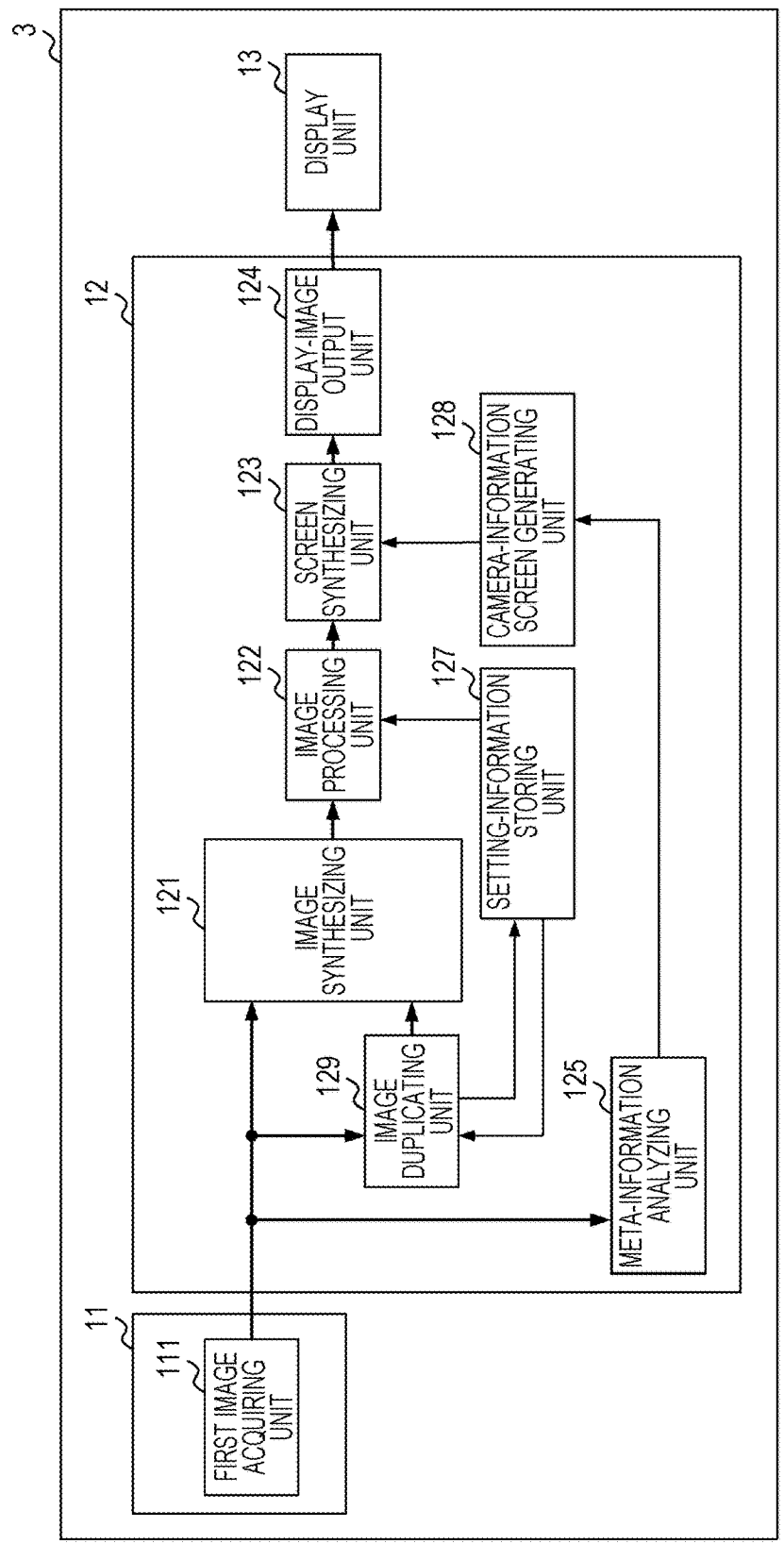
FIG. 15 illustrates the configuration of a display apparatus according to a third embodiment.

FIG. 15 illustrates the configuration of the display apparatus 3 according to the third embodiment. Now, different points from the display apparatus 1 according to the first embodiment will be described.

As in the display apparatus 1, the display apparatus 3 includes the image acquiring unit 11, the display control unit 12, and the display unit 13. The display control unit 12 of the display apparatus 3 is different from the display control unit 12 of the display apparatus 1 in that the display control unit 12 of the display apparatus 3 includes an image duplicating unit 129 and does not include the identity determining unit 126.

The image acquiring unit 11 of the display apparatus 3 is different from the image acquiring unit 11 of the display apparatus 1 in that the image acquiring unit 11 of the display apparatus 3 includes the first image acquiring unit 111 but does not include the second image acquiring unit 112. The first image acquiring unit 111 outputs the first image data item that has been acquired not only to the image synthesizing unit 121 and the meta-information analyzing unit 125, but also to the image duplicating unit 129. Since the image acquiring unit 11 includes only the first image acquiring unit 111, the camera information to be displayed by the display apparatus 3 is always one type of information regardless of the display mode.

If the display control unit 12 determines that the display mode is set to a mode for displaying the plurality of image data items including the first image data item and a second image data item generated by duplicating the first image data item, the display control unit 12 performs predetermined image processing on at least one image data item among the plurality of image data items. In this case, the display control unit 12 does not perform predetermined image processing on at least another one image data item among the plurality of image data items and causes the display unit 13 to display the plurality of image data items.

The setting-information storing unit 127 of the display apparatus 3 holds the image-quality mode for the left screen and the image-quality mode for the right screen independently of the image-quality setting information that has been described in the first embodiment. The image-quality mode is a mode of image quality that is determined for an image on the basis of a predetermined color gamut, gray scale conversion gamma, and the like. By using a lookup table (LUT) that is registered in advance for the movie signal that has been input, the display apparatus 3 can display an image with an image quality desired by a user. Examples of the image-quality mode include "ITU-R BT.709", "ITU-R BT.2020", and "AdobeRGB", and the setting-information storing unit 127 holds the image-quality mode for the left screen and the image-quality mode for the right screen that have been set by the user.

The image processing unit 122 first acquires the image-quality mode for the left screen and the image-quality mode for the right screen from the setting-information storing unit 127. By using an LUT for the image that has been input in accordance with each of the image-quality mode for the left screen and the image-quality mode for the right screen, the image processing unit 122 performs image processing on each of the left screen and the right screen on the basis of the desired image-quality mode. Then, as in the processing described in the first embodiment, the image processing unit 122 performs image-quality setting processing in accordance with the image-quality setting information acquired from the setting-information storing unit 127.

If it is determined that the display mode that is set by the user is a duplicated-multi-image display mode, the image duplicating unit 129 generates a second image data item by duplicating the first image data item that has been input from the first image acquiring unit 111. Here, the duplicated-multi-image display mode means a multi-image display mode in which the second image data item is generated by duplicating the first image data item and in which the first image data item and the second image data item are simultaneously displayed. Note that by the image duplicating unit 129 generating two or more image data items by duplicating the first image data item, the display apparatus 3 may simultaneously display three or more image data items in total.

The display apparatus 3 has, in addition to the "duplicated-multi-image display mode" in which duplication is performed, the "first-image display mode" in which only the first image data item is displayed without performing duplication as described in the first and second embodiments. A user can select a desired display mode from these display modes. Note that as described in the first and second embodiments, the display apparatus 3 may further have a "multi-image display mode" in which a first image data item acquired from outside and a second image data item acquired from outside are simultaneously displayed.

If it is determined that the set display mode is the duplicated-multi-image display mode, the image duplicating unit 129 acquires the image-quality mode for the left screen, the image-quality mode for the right screen, and the image-quality setting information from the setting-information storing unit 127. If the image-quality mode for the left screen is different from the image-quality mode for the right screen, or if any of the items other than the "image-quality setting target" according to the image-quality setting information is "on", the image duplicating unit 129 generates a second image data item by duplicating the first image data item and outputs the generated second image data item to the image synthesizing unit 121. In other cases, the image duplicating unit 129 ends the process without duplicating the first image data item. If the image-quality mode or the image-quality setting information is updated, the image duplicating unit 129 determines again whether or not duplication is to be performed.

Figure 16:
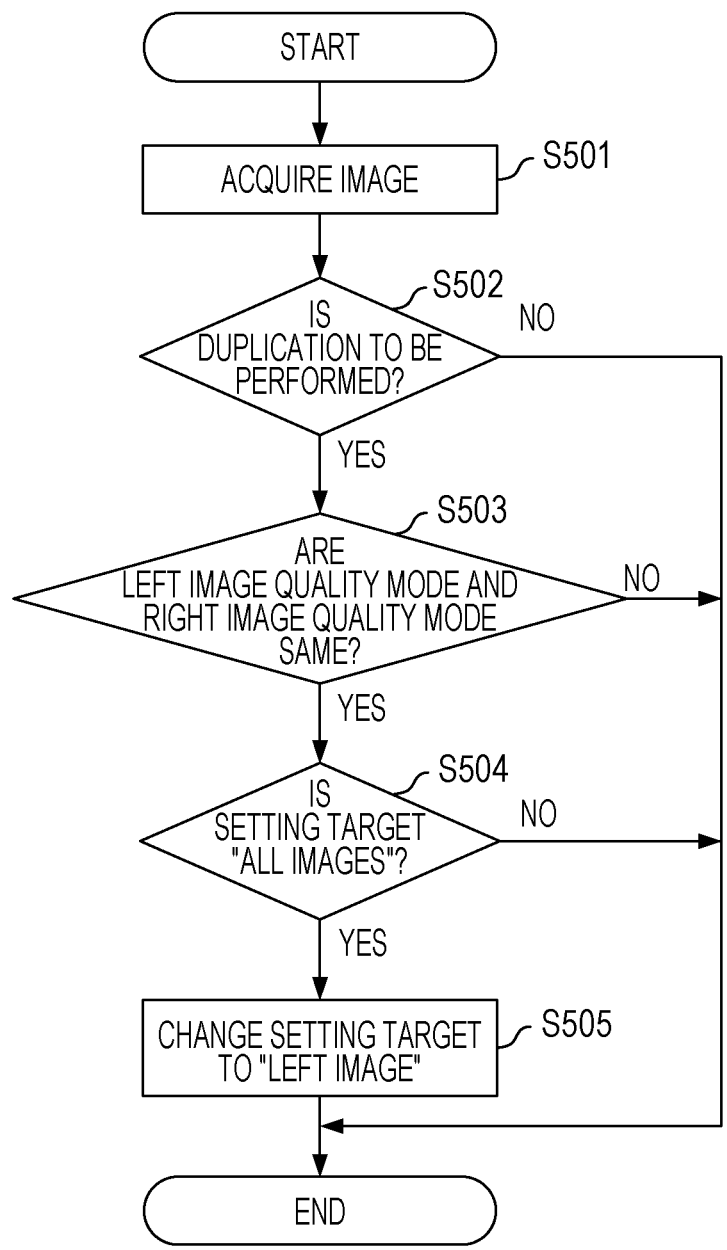
FIG. 16 is a flowchart illustrating a process flow for displaying identical images.

FIG. 16 is a flowchart illustrating a process flow for displaying identical images. The flowchart in FIG. 16 starts from a step in which the image acquiring unit 11 acquires the first image data item (S501). Upon the image acquiring unit 11 acquiring the first image data item, on the basis of the current display mode and the image-quality setting information acquired from the setting-information storing unit 127, the image duplicating unit 129 determines whether or not the first image data item is to be duplicated (S502).

If the image duplicating unit 129 determines that duplication is to be performed in the duplicated-multi-image display mode, the setting-information storing unit 127 refers to the image-quality mode for the left screen and the image-quality mode for the right screen that are held in the setting-information storing unit 127 and determines whether or not the image-quality mode for the left screen is identical to the image-quality mode for the right screen (S503). If it is determined that the image-quality mode for the left screen is identical to the image-quality mode for the right screen, the setting-information storing unit 127 determines that the left image is completely identical to the right image and transitions to step S504 to determine whether or not the "image-quality setting target" is to be changed. If the image-quality mode for the left screen is different from the image-quality mode for the right screen, the setting-information storing unit 127 ends the process without changing the "image-quality setting target".

If it is determined that the image-quality mode for the left screen is identical to the image-quality mode for the right screen, the setting-information storing unit 127 determines whether or not the "image-quality setting target" according to the image-quality setting information is "all images" (S504). If the "image-quality setting target" is "all images", the setting-information storing unit 127 changes the "image-quality setting target" from the "all images" to a "left image" (S505). If the "image-quality setting target" is not "all images" and a "left image" or a "right image" is set, the setting-information storing unit 127 ends the process without changing the "image-quality setting target".

In this manner, if an image data item is duplicated, if the left and right image-quality modes are identical, and if the "image-quality setting target" is "all images", the setting-information storing unit 127 of the display apparatus 3 automatically changes the "image-quality setting target". Accordingly, the display apparatus 3 can perform image processing on one of the first image data item and the second image data item obtained by duplication without a user manually switching the setting.

In addition, if it is determined that duplication is to be performed in the duplicated-multi-image display mode, the display control unit 12 (the screen synthesizing unit 123) superposes, on at least one image data item (e.g., the first image data item) among the plurality of image data items, output-apparatus information that is information related to the image capturing apparatus 5 that has output the first image data item, does not superpose the output-apparatus information on at least another one image data item (e.g., the second image data item) among the plurality of image data items, and causes the display unit 13 to display the plurality of image data items. For example, if it is determined that duplication is to be performed in the duplicated-multi-image display mode, the display control unit 12 causes the output-apparatus information to be disposed and displayed at a position corresponding to the first image data item and does not cause the output-apparatus information to be disposed nor displayed at a position corresponding to the second image data item. Thus, it is possible to prevent the same information from being displayed at a plurality of portions of the display unit 13, thereby increasing image visibility.

Effects of Display Apparatus 3 According to Third Embodiment

As described above, the display apparatus 3 includes the image duplicating unit 129 that duplicates the first image data item acquired by the first image acquiring unit 111 to generate the second image data item. By having such a configuration, on the basis of information as to whether or not an image is to be duplicated or whether or not the image-quality modes are identical, the display apparatus 3 can automatically change the target to be subjected to image processing. Accordingly, the effect of eliminating the need for a user to manually switch the image-quality setting target is produced in a use case in which the first image data item that has been input and the second image data item that has been obtained by duplication are to be simultaneously displayed.

Fourth Embodiment

In the first to third embodiments, the display apparatus 1 to the display apparatus 3 perform image processing and determine the image data item or region that is the target for or in which the output-apparatus information is to be displayed. In contrast, a fourth embodiment is different from the first to third embodiments in that an electronic apparatus that outputs data of an image to a display apparatus or a display panel performs image processing, determines an image data item or a region that is the target for or in which the output-apparatus information is to be displayed, and outputs data of an image that has been subjected to image processing or an image that has been obtained by superposing the output-apparatus information to the display apparatus or the display panel.

The electronic apparatus according to the fourth embodiment is, for example, a computer that outputs the data of an image to the display apparatus or the display panel. By executing programs stored in a recording medium such as a compact-disc read only memory (CD-ROM), a digital versatile disc (DVD), or a hard disk, the computer can perform functions that are equivalent to the functions of the image acquiring unit 11 and the display control unit 12 in the first and second embodiments.

The embodiments of the present invention have been described above. A new embodiment implemented by arbitrarily combining these embodiments is included in the embodiments of the present invention. The effects of the new embodiment implemented by combining the embodiments include the effects of the original embodiments. In addition, the technical scope of the present invention is not limited to the scope according to the above embodiments and can be modified or changed in various manners without departing from the spirit of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-120610 filed Jun. 17, 2016 and Japanese Patent Application No. 2017-045878 filed Mar. 10, 2017, which are hereby incorporated by reference herein in their entirety.

What is claimed is:

1. A display apparatus comprising:
a display configured to display an image;
an image input interface configured to acquire a plurality of image data items from outside; and
a display controller configured to perform predetermined image processing on at least one image data item among the plurality of image data items, to not perform the predetermined image processing on at least another one image data item among the plurality of image data items, and to cause the display to display the plurality of image data items, in a case where it is determined, on the basis of meta-information associated with the plurality of image data items, that the plurality of image data items are image data items that have been output from a single image output apparatus; and
a storage medium configured to store setting information indicating a target to be subjected to the predetermined image processing among the plurality of image data items,
wherein, in a case where the plurality of image data items are image data items that have been output from the single image output apparatus and the setting information indicates that the target is all of the image data items to be displayed by the display, the display controller changes the target from all of the image data items to part of the image data items.

2. The display apparatus according to claim 1, wherein the display controller performs the predetermined image processing on all or none of the image data items among the plurality of image data items and causes the display to display the plurality of image data items in a case where it is determined, on the basis of the meta-information, that the plurality of image data items are not image data items that have been output from the single image output apparatus.

3. The display apparatus according to claim 1, wherein, on the basis of output-apparatus information associated with an image output apparatus that has output the plurality of image data items, the display controller determines whether or not the plurality of image data items are image data items that have been output from the single image output apparatus.

4. The display apparatus according to claim 3,
wherein the output-apparatus information includes information indicating image capturing conditions of the plurality of image data items, and
wherein, on the basis of whether or not the image capturing conditions associated with the plurality of image data items are identical, the display controller determines whether or not the plurality of image data items are image data items that have been output from the single image output apparatus.

5. The display apparatus according to claim 1, wherein, in a case where it is determined, on the basis of the meta-information, that the plurality of image data items are image data items that have been output from the single image output apparatus and in a case where it is determined, on the basis of information indicating signal formats of the plurality of image data items, that the plurality of image data items are identical, the display controller performs the predetermined image processing on at least one image data item among the plurality of image data items and does not perform the predetermined image processing on at least another one image data item among the plurality of image data items and causes the display to display the plurality of image data items.

6. The display apparatus according to claim 1, further comprising
at least one processor that adds, to at least one image data item among the plurality of image data items acquired by the image input interface, display-apparatus information associated with the display apparatus and outputs the at least one image data item.

7. The display apparatus according to claim 6, wherein the at least one processor adds the display-apparatus information including input-unit information for identifying through which of a plurality of image acquiring interfaces included in the image input interface the image data item has been acquired.

8. The display apparatus according to claim 7,
wherein the image input interface includes a first image input interface and a second image input interface, and
wherein, in a case where the display-apparatus information included in meta-information associated with an image data item acquired by the first image input interface includes the input-unit information corresponding to the second image input interface, the display controller determines that the plurality of image data items are image data items that have been output from the single image output apparatus.

9. A display apparatus comprising:
a display configured to display an image;
an input interface configured to acquire an image data item from outside;
a display controller configured to perform predetermined image processing on an image data item, and to cause the display to display an image based on the processed image data item; and
a storage medium configured to store setting information indicating a target to be subjected to the predetermined image processing,
wherein, in a case where a multi-image display mode is set in which a first image data item and a second image data item generated by duplicating the first image data item are to be displayed simultaneously by the display, the display controller automatically changes the target from both of the first and second image data items to one of the first and second image data items.

10. The display apparatus according to claim 9, wherein the predetermined image processing includes peaking processing for enhanced-displaying a region corresponding to a contour section of the image data item to be subjected to the predetermined image processing.

11. The display apparatus according to claim 9, wherein the predetermined image processing includes processing for adding different colors according to a brightness level of the image data item to be subjected to the predetermined image processing.

12. The display apparatus according to claim 9,
wherein, in a case where the multi-image display mode is set and an image-quality mode for the first image data item is identical to an image-quality mode for the second image data item, the display controller automatically changes the target from both of the first and second image data item to one of the first and second image data items, and wherein, in a case where the multi-image display mode is set and an image-quality mode for the first image data item is different from an image-quality mode for the second image data item, the display controller does not automatically change the target.

13. A display control method comprising:

acquiring a plurality of image data items from outside;

performing predetermined image processing on at least one image data item among the plurality of image data items, not performing the predetermined image processing on at least another one image data item among the plurality of image data items, and causing a display to display the plurality of image data items, in a case where it is determined, on the basis of meta-information associated with the plurality of image data items, that the plurality of image data items are image data items that have been output from a single image output apparatus; and storing setting information indicating a target to be subjected to the predetermined image processing among the plurality of image data items, wherein, in a case where the plurality of image data items are image data items that have been output from the single image output apparatus and the setting information indicates that the target is all of the image data items to be displayed by the display, the display controller changes the target from all of the image data items to part of the image data items.

14. A control method for controlling a display apparatus, the control method comprising:

acquiring an image data item from outside;

performing predetermined image processing on an image data item, and causing a display of the display apparatus to display an image based on the processed image data item; and storing setting information indicating a target to be subjected to the predetermined image processing, wherein, in a case where a multi-image display mode is set in which a first image data item and a second image data item generated by duplicating the first image data item are to be displayed simultaneously by the display, the target is automatically changed from both of the first and second image data items to one of the first and second image data items.

15. A display apparatus having display modes, the display apparatus comprising:

a display configured to display an image;

an input interface configured to acquire an image data item from outside; and a display controller configured to perform predetermined image processing on an image data item, and to cause the display to display an image based on the processed image data item, wherein the display modes include a single-image display mode in which only a first image data item is to be displayed by the display and a multi-image display mode in which a first image data item and a second image data item generated by duplicating the first image data item are to be displayed simultaneously by the display, wherein, in a case where a user changes the display modes from the single-image display mode to the multi-image display mode, the display controller automatically performs the predetermined image processing on one of the first and second image data items and does not automatically perform the predetermined image processing on the other of the first and second image data items, and wherein the predetermined image processing is a peaking processing for enhanced-displaying a region corresponding to a contour section of the image data item to be subjected to the predetermined image processing.

16. The display apparatus according to claim 15, wherein the display apparatus is a stationary-type display apparatus.

17. A control method for controlling a display apparatus having display modes, the control method comprising:

acquiring an image data item from outside; and performing predetermined image processing on an image data item, and causing a display of the display apparatus to display an image based on the processed image data item, wherein the display modes includes a single-image display mode in which only a first image data item is to be displayed by the display and a multi-image display mode in which a first image data item and a second image data item generated by duplicating the first image data item are to be displayed simultaneously by the display, wherein, in a case where a user changes the display modes from the single-image display mode to the multi-image display mode, the predetermined image processing is automatically performed on one of the first and second image data items and is not automatically performed on the other of the first and second image data items, and wherein the predetermined image processing is a peaking processing for enhanced-displaying a region corresponding to a contour section of the image data item to be subjected to the predetermined image processing.

* * * * *